United States Patent [19]

Evans

[11] 4,033,424
[45] July 5, 1977

[54] ARTICLE HOLD-DOWN DEVICE

[75] Inventor: Dafydd W. Evans, Euclid, Ohio

[73] Assignee: Towmotor Corporation, Mentor, Ohio

[22] Filed: Apr. 9, 1976

[21] Appl. No.: 675,428

[52] U.S. Cl. .............................. 180/68.5; 248/503; 403/107
[51] Int. Cl.² ........................................ B60R 18/02
[58] Field of Search ............. 180/68.5; 105/51, 50; 248/503, 307; 403/107, 105

[56] References Cited

UNITED STATES PATENTS

| 1,368,191 | 2/1921 | Nelson | 180/68.5 |
| 2,188,532 | 1/1940 | Dominguez | 403/105 |
| 3,007,616 | 11/1961 | Zuckerman | 403/107 |
| 3,254,736 | 6/1966 | Gass | 180/68.5 |
| 3,333,810 | 8/1967 | Schlapman | 180/68.5 |
| 3,367,441 | 2/1968 | Schuster et al. | 180/68.5 |
| 3,420,489 | 1/1969 | Doggett et al. | 180/68.5 |
| 3,557,895 | 1/1971 | Thomas | 180/68.5 |
| 3,581,837 | 6/1971 | Bauschard | 180/68.5 |
| 3,745,853 | 7/1973 | Deibel | 403/107 |
| 3,826,115 | 7/1974 | Davis | 180/68.5 |

Primary Examiner—Philip Goodman
Assistant Examiner—David M. Mitchell
Attorney, Agent, or Firm—Charles E. Lanchantin, Jr.

[57] ABSTRACT

An article hold-down device is disclosed which is capable of restraining movement of a heavy article away from a supporting platform. The hold-down device includes a lower clamping member adaptable to be secured to the platform, an upper clamping member having a projection thereon adaptable to be positioned into a close overlapping orientation with respect to the article, and a coupling member for quickly permitting vertical adjustment of the upper clamping member on the lower clamping member and for positively connecting the clamping members together upon reaching the close, overlapping orientation and to provide a secured condition of the article. The hold-down device is particularly adaptable to restrain vertical movement of a battery on a vehicle.

8 Claims, 7 Drawing Figures

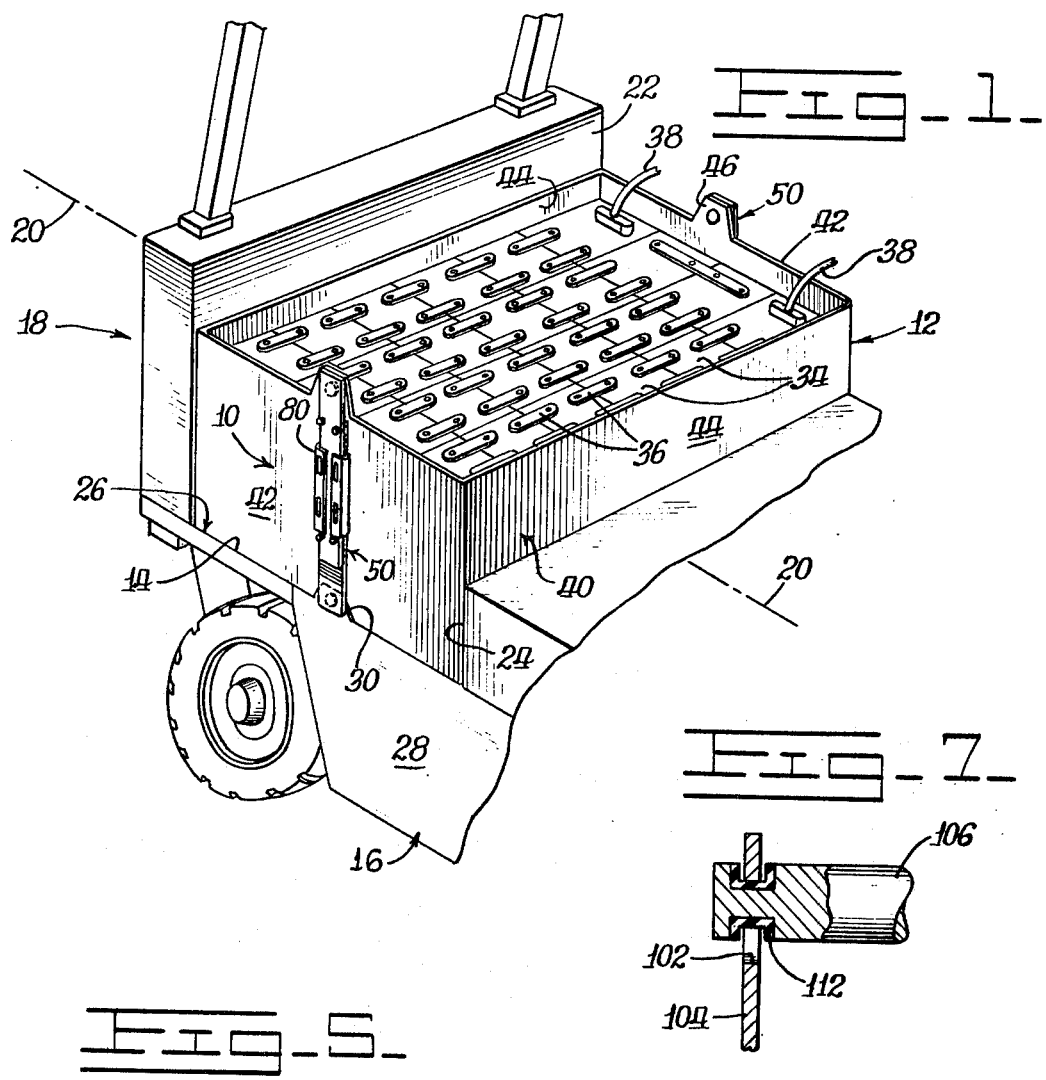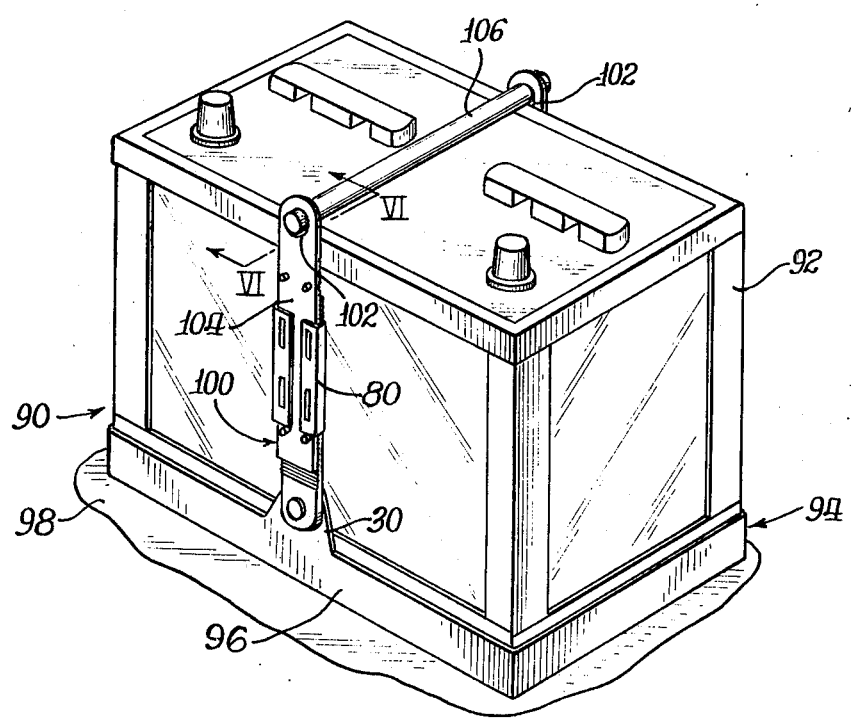

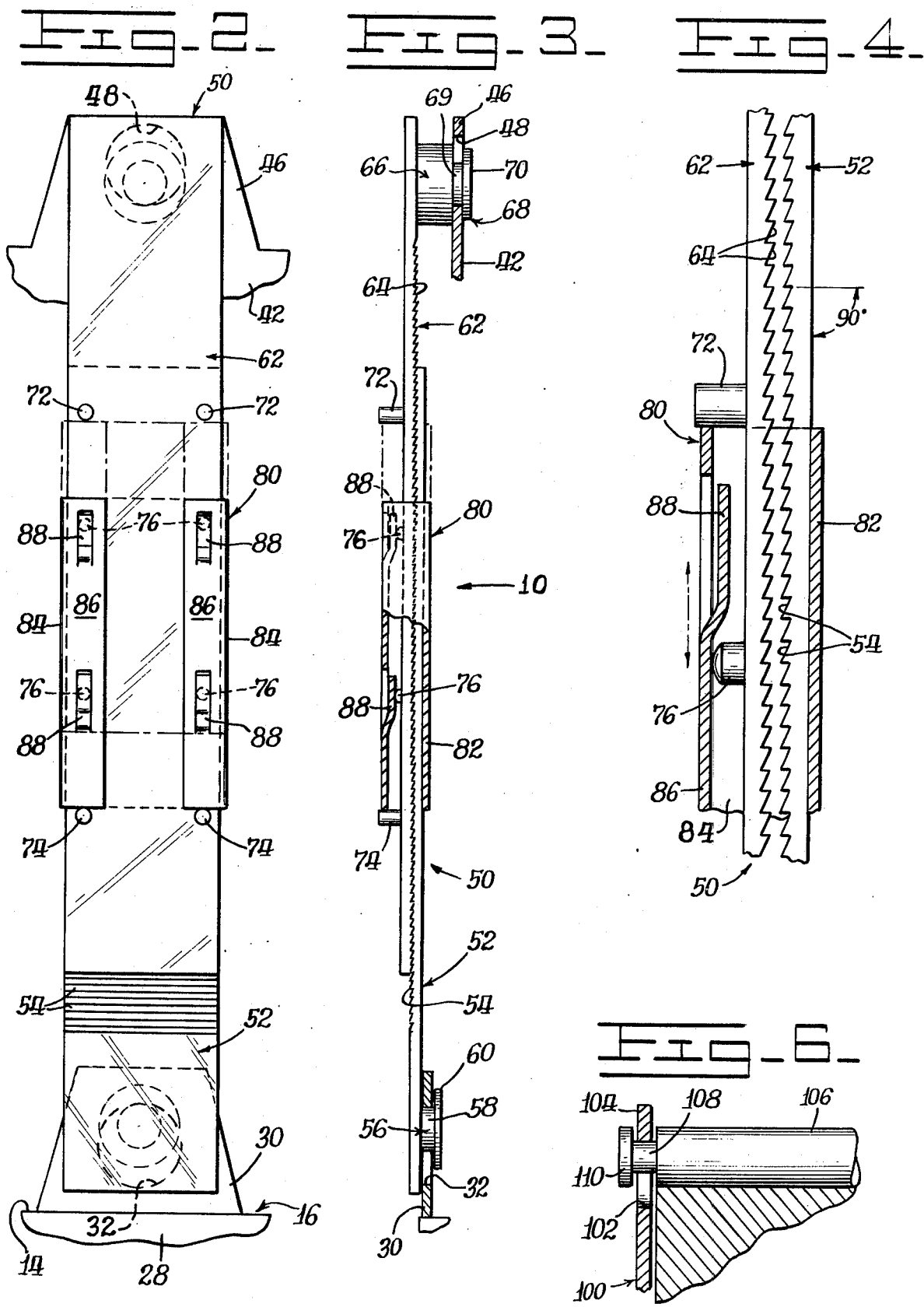

ARTICLE HOLD-DOWN DEVICE

BACKGROUND OF THE INVENTION

This invention relates to a hold-down device for restraining vertical movement of an article away from a supporting platform, and particularly to restrain a heavy battery to the supporting platform of a vehicle.

In many electrically actuated and electrically driven vehicles it is the practice to mount the battery unit within a shallow pan which only restrains horizontal movement thereof. The assumption is made that the heavy weight of the battery is sufficient to hold it within the edges disposed around the periphery of the pan. While this contributes to the ease of serviceability of the battery unit the battery could be dislodged from its position.

The above-mentioned deficiency has been recognized heretofore, and this has resulted in the development of a number of more positive clamping devices which have been utilized to secure a battery unit vertically to the pan. These devices are exemplified by the following U.S. Pat. Nos.:

3,254,736 issued June 7, 1966 to H. A. Goss
3,333,810 issued Aug. 1, 1967 to W. J. Schlapman
3,557,895 issued Jan. 26, 1971 to F. W. Thomas
3,581,837 issued June 1, 1971 to J. H. Bauschard.

Unfortunately, these and other known hold-down devices are not conveniently adjustable and are often excessively complex and costly in construction. For example, threaded bolt and nut clamping devices require a wrench and an extended service period for a mechanic to screw threadably tighten the retaining nuts securely in place. Other constructions are too bulky or are simply not sturdy enough to positively retain the full weight of a heavy battery unit.

SUMMARY AND OBJECTS OF THE INVENTION

Accordingly, it is an object of the present invention to provide a hold-down device which will restrain vertical movement of an article away from a supporting frame.

Another object is to provide such a hold-down device which is conveniently and effectively coupled to or released from an entrapping relation to the article.

Another object is to provide a hold-down device of the character described which is rugged and yet economical in its construction.

Other objects and advantages of the present invention will become more readily apparent upon reference to the accompanying drawings and the following description.

BRIEF DESCRIPTION OF THE DRAWINGS

FIG. 1 is a fragmentary, three-dimensional view of the rear portion of an electrically driven vehicle incorporating a large battery unit and the hold-down device of the present invention.

FIG. 2 is an enlarged fragmentary side elevational view of the hold-down device of FIG. 1.

FIG. 3 is a fragmentary end elevational view of the hold-down device of FIG. 2 with portions broken open to better show details of construction thereof.

FIG. 4 is a greatly enlarged fragmentary end elevational view similar to FIG. 3, only showing the hold-down device in a released condition and details of the inclined teeth incorporated therewith.

FIG. 5 is a three-dimensional view of the first alternate embodiment of the battery hold-down device of the present invention.

FIG. 6 is a fragmentary, transverse sectional view of the upper outside corner of the battery hold-down device of FIG. 5 taken along line VI—VI thereof.

FIG. 7 is a fragmentary sectional view comparable to FIG. 6, only showing a second alternate embodiment construction utilizing an elastomeric isolator.

DESCRIPTION OF THE PREFERRED EMBODIMENT

An article hold-down device 10 embodying the principles of the present invention is shown in FIG. 1 as being associated with both sides of a relatively large and heavy article such as an exchangeable battery unit 12. In the instant example the battery unit is mounted on a supporting platform or surface 14 of a vehicle frame 16 of a vehicle 18 such as an electrically powered industrial fork lift truck.

The fork lift truck 18 has a central longitudinal axis 20, and a rear wall 22 and a front wall 24 disposed transverse to such axis to define a battery-receiving cavity 26 therein. This cavity extends across the lift truck to the opposite sides 28, only one of which is shown. While longitudinal horizontal restraint of the battery unit 12 is thus achieved, an upstanding bracket 30 is disposed longitudinally centrally of the cavity at each of the opposite sides thereof for transverse horizontal restraint as best shown in FIGS. 2 and 3. Each of these brackets has a transversely extending bore or anchor joint 32 defined therethrough.

Referring now to FIG. 1, the battery unit 12 includes a plurality of individual cells 34 electrically intercommunicating in series by way of a plurality of electrical connector bars 36. Suitable cable leads 38 are secured to the end connector bars for operation of the vehicle. In the instant embodiment, 24 cells are used to provide a 48-volt system, with the total weight of the battery unit approaching 1360 Kg (3,000 pounds). The cells are sealed in place with tar or are otherwise integrally secured in a conventional manner within an open box or case 40 having a pair of side walls 42 and a pair of end walls 44. A bracket or lifting eye 46 is integrally secured in an upstanding manner to the central top portion of each of the side walls, so that a transverse bore or anchor joint 48 defined therein and best shown in FIG. 2 is disposed substantially directly above the anchor joint 32 on the vehicle frame 16.

More particularly, and as shown in FIGS. 2, 3 and 4, the hold-down device 10 of the present invention is seen as including a pair of vertically adjustable ratchet mechanisms 50 individually disposed at the opposite sides of the battery unit 12. Each mechanism includes a lower clamping member 52 made from flat metal bar stock or the like which is provided with a vertically arranged plurality of serrations or inclined teeth 54 on the outer face thereof and a fastener 56 on its inner face at the lower end thereof. The fastener includes a transversely extending cylindrical stubshaft 58 with an enlarged head 60 thereon which allows it to be pivotally coupled to the bracket 30 of the support platform.

Each of the ratchet mechanisms 50 also includes an upper clamping member 62 made from economical flat stock with a vertically arranged plurality of serrations or inclined teeth 64 on the inner face thereof which selectively make interlocking engagement with the teeth 54 of the lower clamping member 52. A fastener 66 is disposed above the teeth and on the same inner face of the upper clamping member, which includes a cylindrical projection 68 on the outer end thereof. Specifically, the projection has a reduced diameter portion 69 and an enlarged head 70 in a manner somewhat comparable to the lower fastener 56 and forming a hook thereby. As best shown in FIG. 2, an upper pair of stop pins 72 and a lower pair of stop pins 74 extend outwardly from the outer face of the upper clamping member, and an upper and a lower pair of cam elements 76 extend outwardly from it also at elevationally spaced distances between the stop pins.

In accordance with one aspect of the invention, each of the ratchet mechanisms 50 includes a releasable coupling member or restraining clip 80 for positively coupling the lower clamping member 52 facingly and interlockingly against the overlapping upper clamping member 62. This clip substantially encircles both of the clamping members by having an inner wall 82, a pair of side walls 84 and a pair of longitudinally spaced apart outer walls 86. These outer walls are disposed in substantially vertical alignment with their respective stop pins so that, in use, the clip is entrapped for vertical movement between them. Furthermore, a pair of resilient fingers 88 extend integrally inwardly from each of the side walls in elevationally spaced apart relation corresponding to the vertical distance between the cam elements 76.

Consequently, it may now be appreciated that the restraining clip 80 may be elevationally raised from the locking condition shown in solid lines in FIGS. 2 and 3 to the released condition thereof as shown in phantom lines in these same FIGS., or as shown in the fragmentary enlargement thereof in solid lines in FIG. 4.

OPERATION OF THE PREFERRED EMBODIMENT

While the construction and operation of the present invention is believed clearly apparent from the foregoing description, further amplification will subsequently be made in the following brief summary of the operation thereof. When it is desired to replace the battery unit 12 of the fork lift truck 18 shown in FIG. 1, it is necessary to manually grasp the restraining clip 80 of each of the ratchet mechanisms 50 and to raise them. This action causes each of the four resilient fingers 88 to be released from positive loading interengagement with their respective cam elements 76. As shown in FIG. 4, this released condition of the restraining clip 80 permits the upper clamping member 62 to be limitedly transversely separated from the lower clamping member 52 to disengage the teeth 64 from the teeth 54. The clamping members are then extended with respect to one another sufficiently to align the lower fastener head 60 with the bore 32 and to align the upper fastener head 70 with the bore 48. At this stage the ratchet mechanism can be pulled laterally outwardly away from the sides of the lift truck as an assembly to permit a hoist (not shown) to be connected to the lifting eyes 46 for lifting and transporting of the heavy battery unit in a conventional manner.

Assuming that a new battery unit 12 is now mounted on the support platform 14 in a rather snug relation between the rear wall 22 and front wall 24 of the lift truck, it may be appreciated that if the vehicle is inadvertently tipped over on its side, the battery unit could still be dislodged. However, in accordance with the present invention, the ratchet mechanisms 50 are installed between the anchor joints 32 and 48 on each side of the battery unit to retain it vertically against the platform 14 of the lift truck.

Installation of one of the ratchet mechanisms is conveniently achieved by manual movement of the restraining clip 80 upwardly on the facing clamping members 52 and 62, whereupon the clamping members may be relatively freely extended or retracted with respect to one another. This permits the lower fastener 56 to be elevationally aligned with the anchor joint 32 on the frame 16 and the upper fastener 66 to be similarly aligned with the anchor joing 48 on the battery case 40. The enlarged heads 60 and 78 are then moved transversely inwardly sufficiently to align the cylindrical stubshaft 58 and reduced diameter portion 69 with their respective anchor joints, whereupon the clamping members are retracted to a minimum height so that the projection 68 is hookingly positioned into a close overlapping orientation with respect to the side of the battery unit. The restraining clip is then moved downwardly to its locking condition whereupon the resilient fingers 88 simultaneously engage the cam elements 76. Consequently, the clamping members are forced into biased facing engagement with each other. This positively intermeshes the teeth 54 with the teeth 64. Attention is drawn to the fact that the interlocking ratchet teeth are inclined in such a way as to prevent extension or upward movement of the upper clamping member when the ratchet mechanism 50 is resiliently biased together by the clip 80. Accordingly, even if the lift truck would be tipped over on its side, the battery unit would be restrained from movement normally away from the platform 14 by the one-way acting ratchet teeth under such conditions.

DESCRIPTION OF THE FIRST ALTERNATE EMBODIMENT

Referring now to FIGS. 5 and 6, an alternate embodiment battery hold-down device 90 is shown in conjunction with a more common automobile battery 92. A shallow metal pan 94 having four upstanding sides 96 is suitably secured to a vehicle frame 98, and the battery seats within it so that horizontal movement thereof is restricted by the sides. To prevent any inadvertent removal of the battery from the pan, a pair of ratchet mechanisms 100 are pivotally secured to the pan on the opposite sides of the battery in a manner very similar to the ratchet mechanism 50 of the preferred embodiment. The alternate embodiment differs, however, in the construction of the upper part of the mechanisms and how they jointly resist any upward movement of the battery.

As is clearly apparent from FIG. 6, the upper portion of each of the ratchet mechanisms 100 has a modified construction at a bore or anchor joint 102 of an upper clamping member 104. Moreover, a restraining member or fastener 106 is coupled to these anchor joints transversely and overlapping across the top of the battery. Preferably, the restraining member has a cylindrical neck 108 and a cylindrical head 110 at each end thereof, and the necks are insertably positioned hookingly in the anchor joints.

With the restraining clips 80 disposed in a raised or released condition, the restraining member 106 may be pushed downwardly until it makes contact with the battery. Thereupon the clips on each side of the battery 92 are lowered to their loaded conditions to lock the ratchet mechanisms 100 in an identical manner to that described above with respect to the mechanisms 50.

DESCRIPTION OF A SECOND ALTERNATE EMBODIMENT

While it is recognized that the ratchet mechanisms 50 and 100 discussed above can be made from electrically nonconducting materials, it may be appreciated that an elastomeric isolator or rubber grommet 112 may be used in conjunction therewith as shown in FIG. 7. In the instant example the isolators are located at each of the upper anchor joints 102 and, specifically, are an integral part of the opposite ends of the restraining member 106, otherwise discussed above in connection with FIGS. 5 and 6. However, it is understood that these isolators may be located at the lower anchor joints as well. Not only can such isolators interrupt any electrical contact path between the restraining member and the ratchet mechanisms, but also they may serve as resilient cushions to impose a light compressive preload on the top of the battery unit when the ratchet mechanisms are fully retracted.

It is thus apparent that the rugged and economical hold-down device of the present invention may be conveniently manually coupled to or released from an article such as a battery unit in order to positively retain it in a vertical direction to the support platform. With both the horizontal and vertical restraints the electrical connections of the battery unit are less likely to be disturbed, which reduces the possibility of an electrical shock or fire hazard. The upper clamping member of each mechanism is advantageously quickly vertically adjusted on the lower clamping member to permit close positioning thereof into an entrapping relation to the top of the battery unit. In this connection it should be appreciated that a variety of projections can extent inwardly from the upper clamping members in overlapping relation to the sides of the battery unit to entrap it, and that the projections can be directly interconnected across the full width of the battery unit, without departing from the spirit of the present invention. Moreover, while sawtooth serrations have been described above to permit "ratchet" shortening of the mechanism in one direction, it is further contemplated that rough friction facings or the like can also be utilized on the interengaging faces of the cooperating clamping members. Sawtooth serrations are preferred, however, to provide sufficient joint strength to restrain movement of a battery weighing several thousand pounds and with advantageously small bulk.

While the invention has been described and shown with particular reference to a preferred embodiment, it will be apparent that variations might be possible that would fall within the scope of the present invention, which is not intended to be limited except as defined in the following claims.

What is claimed is:

1. An article hold-down device for restraining movement of an article away from a supporting platform, comprising:
   a lower clamping member having a plurality of serrations and being connected to the platform;
   an upper clamping member having a plurality of serrations connected to the article;
   a releasable coupling element slidably movable along the clamping members between a released position at which the serrations of the clamping members are spaced apart and the upper clamping member is movable relative to the platform and a locking position at which the serrations of the clamping members are interlockingly engaged and the upper clamping member is maintained at a preselected position relative to the platform; and
   cam means effective in the locking position of the coupling element and interacting between the coupling element and the clamping members for resiliently biasing the clamping members together and restraining movement of the article.

2. The article hold-down device of claim 1 wherein said serrations are ratchet teeth, the teeth being inclinded in a direction sufficient for preventing the upper clamping member from moving away from the platform in the locking position of said coupling element.

3. The article hold-down device of claim 2 wherein the coupling element is a restraining clip encircling the clamping members.

4. The article hold-down device of claim 3 wherein said cam means includes a cam element secured to the upper clamping member, and the restraining clip includes a resilient finger engaged with the cam element in the locking position.

5. The article hold-down device of claim 4 including stop means on the upper clamping member for limiting movement of the restraining clip.

6. The article hold-down device of claim 4 wherein the article is a battery unit and the platform is a supporting frame on a vehicle.

7. The article hold-down device of claim 6 including an anchor joint connected to the platform and wherein the lower clamping member is pivotally connected to said anchor joint.

8. The article hold-down device of claim 7 wherein said battery unit has a second anchor joint and wherein the upper clamping member is pivotally connected to said second anchor joint.

* * * * *